United States Patent [19]
Qian et al.

[11] Patent Number: 5,574,639
[45] Date of Patent: Nov. 12, 1996

[54] SYSTEM AND METHOD FOR CONSTRUCTING FILTERS FOR DETECTING SIGNALS WHOSE FREQUENCY CONTENT VARIES WITH TIME

[75] Inventors: Shie Qian, Austin, Tex.; Mark E. Dunham, Los Alamos, N.M.

[73] Assignee: National Instruments Corporation, Austin, Tex.

[21] Appl. No.: 322,053

[22] Filed: Oct. 12, 1994

[51] Int. Cl.⁶ .................................................. G06F 17/10
[52] U.S. Cl. .......................... 364/724.01; 364/724.11; 364/724.16
[58] Field of Search .................... 364/724.01, 724.07, 364/724.08, 724.09, 724.11, 724.16

[56] References Cited

U.S. PATENT DOCUMENTS

| | | | |
|---|---|---|---|
| 4,493,080 | 1/1985 | Campbell | 364/724.11 |
| 4,633,426 | 12/1986 | Venier | 364/724.11 |

*Primary Examiner*—David H. Malzahn
*Attorney, Agent, or Firm*—Jeffrey C. Hood

[57] ABSTRACT

A system and method for constructing a bank of filters which detect the presence of signals whose frequency content varies with time. The present invention includes a novel system and method for developing one or more time templates designed to match the received signals of interest and the bank of matched filters use the one or more time templates to detect the received signals. Each matched filter compares the received signal x(t) with a respective, unique time template that has been designed to approximate a form of the signals of interest. The robust time domain template is assumed to be of the order of w(t)=A(t)cos{2πϕ(t)} and the present invention uses the trajectory of a joint time-frequency representation of x(t) as an approximation of the instantaneous frequency function {ϕ'(t). First, numerous data samples of the received signal x(t) are collected. A joint time frequency representation is then applied to represent the signal, preferably using the time frequency distribution series (also known as the Gabor spectrogram). The joint time-frequency transformation represents the analyzed signal energy at time t and frequency $f$, P(t,f), which is a three-dimensional plot of time vs. frequency vs. signal energy. Then P(t,f) is reduced to a multivalued function f(t), a two dimensional plot of time vs. frequency, using a thresholding process. Curve fitting steps are then performed on the time/frequency plot, preferably using Levenberg-Marquardt curve fitting techniques, to derive a general instantaneous frequency function ϕ'(t) which best fits the multivalued function f(t), a trajectory of the joint time-frequency domain representation of x(t). Integrating ϕ'(t) along t yields ϕ(t), which is then inserted into the form of the time template equation. A suitable amplitude A(t) is also preferably determined. Once the time template has been determined, one or more filters are developed which each use a version or form of the time template.

35 Claims, 7 Drawing Sheets

SYSTEM AND METHOD FOR CONSTRUCTING FILTERS FOR DETECTING SIGNALS WHOSE FREQUENCY CONTENT VARIES WITH TIME

The U.S. Government has a paid-up license in this invention and the right in limited circumstances to require the patent owner to license others on reasonable terms as provided for by the terms of contract No. W-7405-ENG-36 awarded by The Department of Energy (DOE).

FIELD OF THE INVENTION

The present invention relates to a method for building transversal filters, or matched filters, for detecting the presence of signals whose frequency content varies with time, and more particularly to a system and method for developing robust time templates designed to match signals of interest, wherein the signals of interest have a frequency content which varies with time.

DESCRIPTION OF THE RELATED ART

In many fields it is greatly desirable to be able to reliably detect the presence of signals of interest. One broad class of signals comprises signals whose frequency content varies with time. Signals whose frequency content varies with time can occur in one of several ways. First, the signal may have a frequency content which varies with time when the signal is generated. Signals with a time-varying frequency content arise in such diverse fields as acoustics, seismic analysis, radar, and many other forms of communication. Second, many signals $s(t)$ do not have a time-varying frequency content when they are generated, but pass through a medium which transforms, corrupts and/or disperses the signals, whereby the received signal $x(t)$ has a frequency content which varies with time. For example, a signal of interest $s(t)$ that travels through an ionized gas (plasma) or the ionosphere becomes heavily dispersed resulting in a new signal referred to as $x(t)$. Both plasma and the ionosphere have a frequency response whereby the frequency content varies with time. As a result, the received signal $x(t)$ will also have a frequency content that varies with time, even if the signal $s(t)$ did not originally have a frequency content that varied with time.

Therefore, an improved system and method is desired for building filters for detecting signals whose frequency content varies with time. Such a system and method would have applications in a number of various fields.

SUMMARY OF THE INVENTION

The present invention comprises a system and method for constructing filters which detect the presence of signals whose frequency content varies with time. The system and method of the present invention will prove extremely useful in many fields, including acoustics, radar, seismic signal processing, satellite communications, and many others.

The present invention includes a novel system and method for developing one or more time templates designed to match the received signal of interest. The present invention includes construction of one or more filters, preferably a bank of matched filters, which use the one or more time templates detect the received signals. In the preferred embodiment, each matched filter compares the received signal $x(t)$ with a respective time template $W_k(t)$ that has been designed to approximate the signals of interest. In the preferred embodiment, each filter in the bank uses a different time template that varies by one or more factors from other time templates used by other filters. If one or more matches occurs, then the received data is determined to have signal data of interest. This signal data can then be analyzed and/or used for the desired purpose.

The one or more filters are designed and constructed using the following method. First, the various time templates used in one or more filters are determined. The robust time domain template is assumed to be of the order of $w(t) = A(t)\cos\{2\pi\phi(t)\}$. In other words, the received signal $x(t)$ can be represented as an amplitude and phase according to the equation $A(t)\cos\{2\pi\phi(t)\}$. The instantaneous frequency is known to be equal to the derivative of the phase $\phi(t)$. The present invention uses the trajectory of a joint time-frequency representation of $x(t)$ as an approximation of the instantaneous frequency function $\phi'(t)$. The instantaneous frequency function $\phi'(t)$ is then integrated to obtain $\phi(t)$, which is then substituted into the $w(t)$ equation. A suitable amplitude $A(t)$ is also determined, as necessary.

The method for determining the phase $\phi(t)$ for the time template equation is as follows. First, numerous data samples of the received signal $x(t)$ are collected. A joint time frequency distribution series is then applied to represent the signal, preferably using the time frequency distribution series (also known as the Gabor spectrogram). The joint time-frequency transformation represents the analyzed signal energy at time $t$ and frequency $f$, $P(t,f)$, which is a three-dimensional plot of time vs. frequency vs. signal energy. Then $P(t,f)$ is reduced to a multivalued function $f(t)$, a two dimensional plot of time vs. frequency, using a thresholding process. Curve fitting steps are then performed on the time/frequency plot, preferably using Levenberg-Marquardt curve fitting techniques, to derive a general instantaneous frequency function $\phi'(t)$ which best fits the multivalued function $f(t)$, a trajectory of the joint time-frequency domain representation of $x(t)$. Integrating $\phi'(t)$ along $t$ yields $\phi(t)$, which is then inserted into the form of the time template equation $$w(t) = A(t)\cos\{2\pi\phi(t)\}.$$

As noted above, a suitable amplitude is also selected which preferably has properties common to all signals of interest. This amplitude is also substituted into the time template equation.

Once the time template has been determined, one or more filters are developed which each use a version or form of the time template. If one time template suitably matches all received signals $x(t)$, then one filter is constructed which uses the one time template. If a plurality of different versions or forms of the time template are necessary to match the received signals $x(t)$, then a plurality of filters are constructed which each use a unique version of the time template, varying according to one or more factors or parameters. The time templates preferably vary across a range to match all possible variations of the received signal $x(t)$ encountered in real-time applications.

In one embodiment, the system and method of the present invention is used to build a matched filter bank to detect broadband signals received by a satellite, wherein the broadband signals have become heavily dispersed from travel through the ionosphere. The signals received by the satellite are in the form of a non-linear chirp signal whose frequency content monotonically increases with time. The equation discovered according to the method of the present invention which describes the band limited chirp trajectory for a chirp signal that monotonically increases with time was found to be $$t = t_0 + \frac{K}{[f_\infty - \phi'(t)]^2}, \quad f_0 \leq \phi'(t) < f_\infty$$

where $t_0$ is the arrival time of the non-linear chirp signal, and K is the curvature constant for the chirp. $\phi'(t)$ asymptotically converges to $f\infty$. The above equation perfectly fits all non-linear chirp patterns encountered in real time applications with different parameter settings.

The term $t_0$ is set equal to 0 and the instantaneous frequency $\phi'(t)$ is determined to be $$\phi'(t) = f_\infty - \sqrt{\frac{K}{t}}$$

where $f_0 \leq \phi'(t) < f\infty$. Integrating $\phi'(t)$ along t yields $$\phi(t) = f_\infty t - 2\sqrt{Kt}.$$

Finally, substituting $\phi(t)$ into the general form of the time template equation yields:

$$w_k(t) = \cos\{2\pi(f_\infty t - 2\sqrt{Kt})\} \left\{ U\left(t - \frac{K}{(f_\infty - f_0)^2}\right) - U\left(t - \frac{K}{(f_\infty - f_s/2)^2}\right) \right\}$$

where $f_s$ denotes the sampling frequency, which is twice the highest frequency contained in x(t). U(t) denotes the unit step function, which is used to generate the amplitude function as $$A(t) = U\left[t - \frac{K}{(f_\infty - f_0)^2}\right] - U\left[t - \frac{K}{(f_\infty - f_s/2)^2}\right],$$

which ensures that the time template $w_k(t)$ sweeps from $f_0$ to $f_s/2$. A plurality of filters, preferably matched filters, are then built which each use different time templates varying by the parameter K. These varying time templates are used in a bank of matched filters according to this embodiment of the present invention to detect the desired signals of interest.

Therefore, the present invention comprises a system and method for constructing one or more filters for detecting signals whose frequency content varies with time. Each of the filters include a time template designed to match a form of the received signal. The time templates are developed using a novel system and method according to the present invention.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
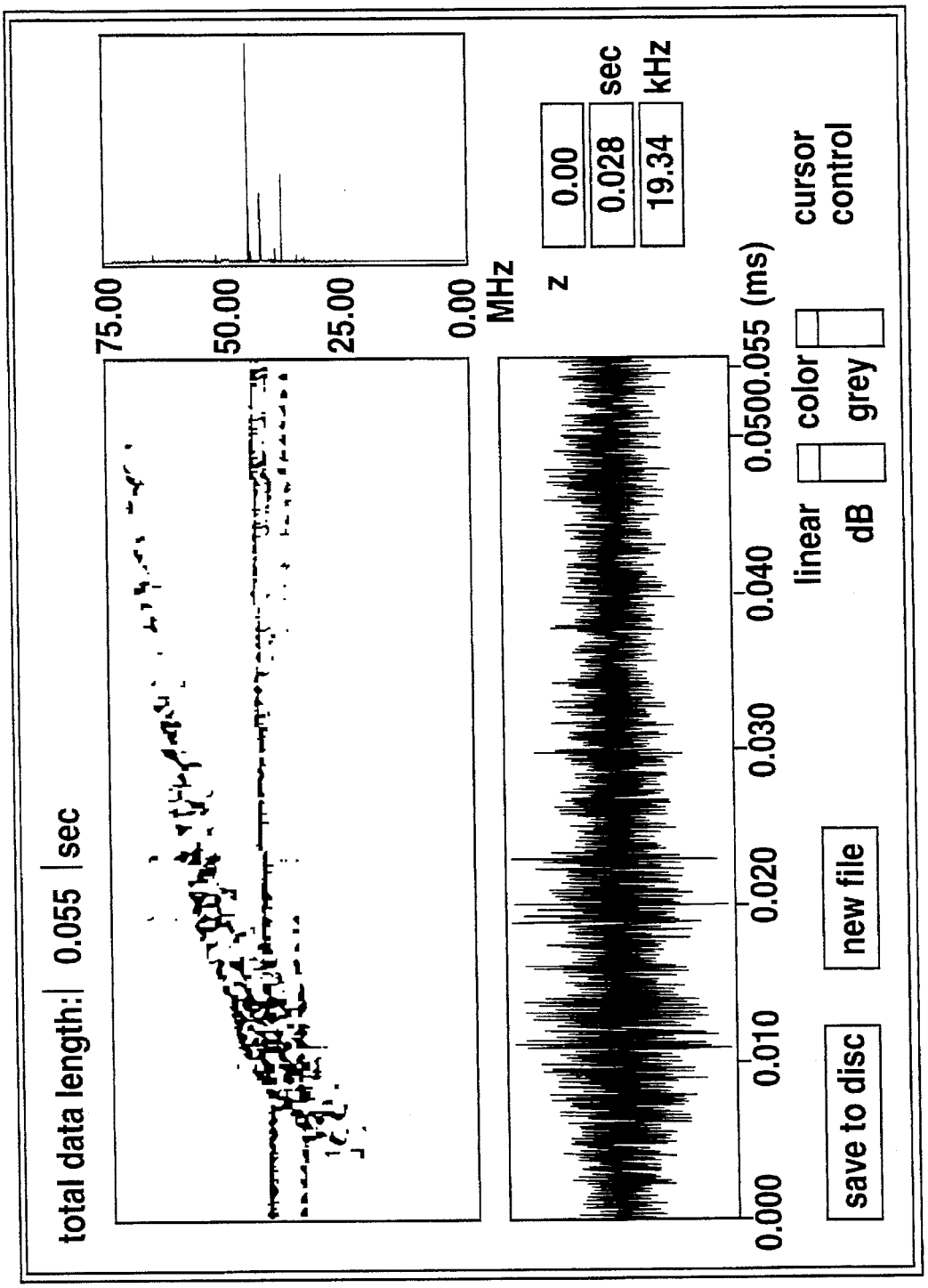
FIG. 1 illustrates a received time domain signal x(t), the power spectrum of the signal x(t), and a joint time frequency representation of the signal x(t)

Referring now to FIG. 1, the joint time-frequency representation is powerful in analyzing a signal whose frequency content varies in time, because it characterizes the signal in time and frequency simultaneously. FIG. 1 illustrates real time data samples of a chirp signal, the corresponding power spectrum of the real time data samples, and the joint time-frequency representation of the real time data samples. A chirp signal is a signal whose frequency content monotonically increases or decreases with time. The data samples of FIG. 1 were transcribed from signals received by the DOE Alexis/Blackbeard satellite now in orbit. The bottom plot of FIG. 1 illustrates a time waveform of the data samples which appears featureless and similar to white noise. The plot on the right side of FIG. 1 is a traditional power spectrum of the time waveform which is dominated by strong radio carrier signals. The middle plot illustrates the joint time-frequency representation of the signal, which clearly displays one non-linear "chirp" signal. While noise tends to evenly spread out in the entire time-frequency space, the energy of the chirp type signal is shown clearly in the joint-time frequency domain. Consequently, the SNR of a chirp-type signal is significantly improved in the joint time-frequency domain. Therefore, while the time waveform appears as typical white noise and the power spectrum is dominated by strong radio carrier signals, the frequency varying pattern of a non-linear chirp signal is clearly seen in the joint time-frequency domain.

For many applications, it is impractical or undesirable to perform real time detection (or pattern recognition) of signals in the joint time-frequency domain. For example, for broadband signals having a range of 75 MHz, the sampling rate is as high as 150 MHz (twice the 75 MHz bandwidth). As a result, the computation burden associated with detecting signals using the joint time-frequency transformation is beyond what is offered by currently available technology. Even with optimal algorithms, the operation count is of the order Nlog(N), where N is the number of frequency bins and is typically 128. The implied computational rate would be 1,000 floating point operations/6 nanoseconds or 150 Gigaflop. The computation burdens are also large for narrowband signals and/or signals transmitted at a specified frequency. Therefore, the present invention includes a system and method for developing one or more time domain templates for use by one or more filters, wherein the filters are optimum in the sense of maximizing SNR and feasible for analog implementation.

It is noted that time domain matched filters are commonly employed in radar signal processing for linear chirps with known rates, where the filter is implemented in surface acoustic wave (SAW) or acoustic-optic (A-O) technologies. However, in the more general case where the chirp rate is non-linear and/or unknown, a major problem in using a time domain matched filter is determining or selecting the proper time template. For example, when the received signals x(t) are chirp type functions, the changing rate of their frequency and bandwidth could vary dramatically. The frequency trajectory (df/dt) of the signal x(t) can vary by a factor of 1000, depending on test frequency and the medium of transmission, while the instantaneous bandwidth can vary by a factor of 10 in the observed x(t). Selection of the proper time template becomes even more problematic where the frequency content of the signal non-monotonically changes with time. Therefore, it is difficult to develop a robust time template from the time or frequency domain alone to match the received signal x(t) whose frequency content varies with time. The present invention utilizes the joint time-frequency representation to develop a robust time template. Thus, the present invention utilizes a novel system and method for selecting the time template in order to build the proper filter(s), and this system and method is described below.

The template design methodology of the present invention is useful for the detection of any type of signal whose frequency content varies with time, including such diverse applications as geophysical research, acoustical signal analysis, and the natural sciences, among others. It is noted that the actual signal s(t) is not required to have a frequency content which varies with time. If a signal s(t) travels through a media, wherein the media transforms or disperses the signal s(t) into a signal x(t) whose frequency content varies with time, then the present invention may be used to detect this signal. The template design methodology of the present invention can be used whenever the received signal behavior follows a derivable or testable parametric rule.

FLOWCHART DIAGRAM

Figure 2:
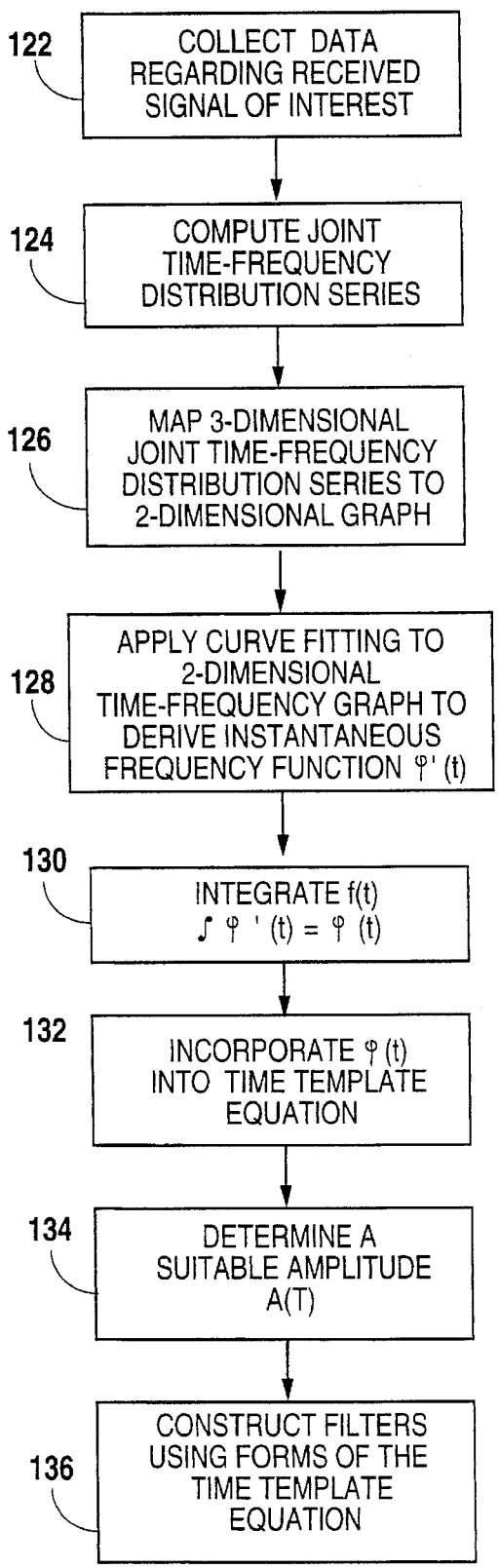
FIG. 2 is a flowchart diagram illustrating a method for constructing one or more filters according to the present invention to detect signals of interest whose frequency content varies with time.

Referring now to FIG. 2, a flowchart diagram illustrating operation of a method for deriving a robust time template and for constructing one or more filters for detecting signals of interest whose frequency content varies with time is shown. The time domain template is assumed to take the form of $$w(t)=A(t) \cos \{2\pi\phi(t)\}.$$

Other forms of the time template equation, such as an exponential or sine form, may possibly be used. As shown, in step 122 data is first collected regarding the received signals of interest. In order to build one or more matched filters for detecting the signals of interest, it is important to at least have some partial knowledge about the shape of the signal. Thus, the method of the present invention assumes that there is an ensemble or small set of representative signals of the desired type which are available to analyze. One method used to obtain the necessary data is to collect a large sample of received data, find the signals of interest and then use these signals of interest as the collected data.

Joint Time-Frequency Representation

Once sufficient data has been collected regarding a received signal of interest in step 122, in step 124 a joint time-frequency representation is generated to describe these signals. As mentioned earlier, the frequency content of the received signal x(t) changes with time. The received signal may be a linear or non-linear chirp type signal or the frequency content of the signal may non-monotonically change with time. Therefore, this signal is better recognized in the joint time-frequency domain rather than in the time or frequency domain alone. In the preferred embodiment the time-frequency distribution series (TFDS), otherwise known as the Gabor spectrogram, is used to compute a representation of these signals in the joint time-frequency domain for the purpose of instantaneous frequency estimation. For more information on the joint time-frequency representation, please see L. Cohen, "Time-Frequency distribution—A Review," *Proceedings of the IEEE*, vol. 77, No. 7, July 1989, pp. 941–981, which is hereby incorporated by reference in its entirety.

It is noted that a Wigner-Ville distribution is not used because of the severe cross term interference. The WVD is discussed in J. Ville, "Theorie et applications de la notion de signal analytique," (in French) *Cables et Transmission*, vol. 2, 1948, pp. 61–74; E. P. Wigner, "On the Quantum Correction for Thermodynamic Equilibrium," *Phys. Rev.*, vol. 40, 1932, pp. 749; and T. A. C. M. Claasen and W. F. G. MecklenbrŠuker, "The Wigner Distribution—a Tool for Time-Frequency signal Analysis," *Philips J. Res.*, vol. 35, 1980, pp. 217–250, pp. 276–300, pp. 1067–1072 which are all hereby incorporated by reference in their entirety.

For a signal $z(t)=A(t)\exp\{i2\pi\phi(t)\}$, the instantaneous frequency is traditionally defined as the first derivative of phase function $\phi(t)$, which describes how frequency contents change in time. For a joint time-frequency representation P(t,f), the first conditional moment is $$<f>_t = \frac{\int f P(t,f) df}{\int P(t,f) df} \quad (3)$$

which normally is considered as the mean instantaneous frequency. It is noted that unless otherwise indicated, the limits of integration extend from $-\infty$ to $\infty$. In computing a robust time template, it is desired that the mean instantaneous frequency computed by the joint time-frequency representation be equal to the signal instantaneous frequency, i.e., $$<f>_t = \phi'(t).$$

1. Short Time Fourier Transform

One of most popular joint time-frequency representations is the short-time Fourier transform (STFT) defined as $$STFT(t,f) = \int z(\tau) g(\tau-t) \exp\{-i2\pi f\tau\} d\tau,$$

where $g(t) = A_g(t) \exp\{i2\pi\phi_g(t)\}$ is a window function. If P(t,f) is replaced by $|STFT(t,f)|^2$ in the first conditional moment equation above, then $$<f>_t = \frac{\int A^2(\tau) A_g^2(\tau-t) \phi'(\tau) d\tau}{\int A^2(\tau) A_g^2(\tau-t) d\tau} + \frac{\int A^2(\tau) A_g^2(\tau-t) \phi_g'(\tau) d\tau}{\int A^2(\tau) A_g^2(\tau-t) d\tau}. \quad (4)$$

The equation immediately above shows that the mean instantaneous frequency of $|STFT(t,f)|^2$ is subject to the selection of the window function g(t). In general, $<f>_t \neq \phi'(t)$ unless the window length is very narrow, say $A_g(t) \approx \delta(t)$. In this case, however, the frequency resolution will be degraded significantly compared to the extended time windows normally employed.

For many cases the instantaneous frequency of practical window functions $\phi_g'(t)$ is close to DC. In other words, $\phi_g'(t) \approx 0$. In this case, if the window length is selected to be much smaller than the length of the analysis data, then the difference between $<f>_t$ and $\phi'(t)$ is found to be negligible. In particular, because of the simplicity and efficiency of implementation, the STFT can be an expedient estimator of instantaneous frequency for many applications. However, the STFT is not an ideal representation for tracking the instantaneous frequency φ'(t) because the use of different windows leads to different "instantaneous frequency" trajectories.

2. Time Frequency Distribution Series

Therefore, the present invention uses the time frequency distribution series (TFDS), also known as Gabor spectrogram, to obtain a joint time-frequency representation of the signal x(t). The TFDS is computed by applying the Gabor expansion and the WVD together to decompose a signal as a linear combination of two-dimensional (time and frequency) harmonics series, which is referred to as the time-frequency distribution series (TFDS). For more information on the Gabor expansion, please see D. Gabor, "Theory of Communication," *J. IEEE* (London), vol. 93, No. III, November 1946, pp. 429–457 which is hereby incorporated by reference. For more information on the Gabor Spectrogram or the TFDS, please see S. Qian and D. Chen, "Decomposition of the Wigher-Ville Distribution and Time-Frequency Distribution Series" to appear in *IEEE Trans. on Signal Processing*, October 1994. Please see also U.S. application Ser. No. 07/851,725 filed Mar. 17, 1992, titled "Method for Time-Varying Spectrum Analysis," which is now U.S. Pat. No. 5,353,233, whose inventors are Shie Qian and Dapong Chen, which is hereby incorporated by reference.

The TFDS can be represented as follows:

$$TFDS_D(t,f) = \sum_{d=0}^{D} P_d(t,f), \quad (5)$$

where the subscript d is the order of the TFDS term, which indicates the degree of oscillation. Higher values of d give stronger oscillatory behavior in the TFDS, but also include less energy. The majority of signal energy is contained in a few lower order terms $P_d(t,f)$. Higher harmonic terms possess less signal energy and cause cross-term interference. On the other hand they significantly improve resolution of the joint time-frequency representation. When D=0. $TFDS_0(t,f)=P_0(t,f)$ is non-negative and similar to the STFT using a Gaussian window (which has low resolution). As higher harmonics terms are included (increasing D), the resolution of $TFDS_D(t,f)$ increases, but cross-term interference also becomes more severe. For D→∞. $TFDS_\infty(t,f)$ converges to the Wigner-Ville distribution. By adjusting the order of TFDS, one is able to effectively balance the cross-term interference and resolution for each problem of interest. Factors which influence the order selection are the number of simultaneous frequencies present, and the signal to random noise ratio in the time series.

It has been shown both analytically and numerically that the TFDS has much better joint time-frequency resolution than the STFT. While maintaining a good frequency resolution, the mean instantaneous frequency computed by TFDS can be very close to the signal instantaneous frequency.

It is also noted that the mean instantaneous frequency leads to a meaningful result only for monotone and noiseless signals. This equation cannot be directly used to estimate the instantaneous frequency in most real applications. For instance, if the analyzed signal contains two components, $s_1(t)$ and $s_2(t)$, their instantaneous frequencies are $\phi'_1(t)$ and $\phi'_2(t)$ respectively. Instead of giving two separate real instantaneous frequencies, the answer of the above equation will most likely be $\{\phi'_1(t)+\phi'_2(t)\}/2$, which is not the desired result.

Although the mean instantaneous frequency does not give correct instantaneous frequencies in most applications, the trajectory of the joint time-frequency representation does characterize signal time-varying behavior, as long as the different components are distinguishable. It is noted that the trajectory of the joint time-frequency representation is always a very good approximation of φ'(t), regardless of whether the signal is monotone or has multiple components. Therefore, a curve fitting technique is used according to the present invention to derive a general instantaneous frequency function.

Therefore, in step 124, the joint time-frequency distribution series (TFDS) is computed for the received signal x(t). For a good estimation, the joint time-frequency representation must have:

(1) minimum cross-term interference, thereby being able to identify non-linear chirp signals in a noise environment;

(2) a trajectory closer to the instantaneous frequencies.

The short-time Fourier transform and Wigher-Ville distribution do not satisfy these two requirements simultaneously. The low order time-frequency distribution series is found to suitably compromise time-frequency resolution and cross-term interference problems. In all cases, $TFDS_2(t,f)$ is chosen. Although the original SNR is less than zero dB, the chirp patterns are obvious in the joint time-frequency representation. As noted above, the WVD essentially does not work in this application, because in the WVD, all chirp patterns completely disappear due to the presence of noise. Thus, as discussed above, the $TFDS_D(t,f)$ provides a very good approximation of the instantaneous frequency function φ'(t), while also having limited cross-term interference. More exactly, the trajectory of the TFDS is a good approximation of the instantaneous frequency function φ'(t).

Figure 3:
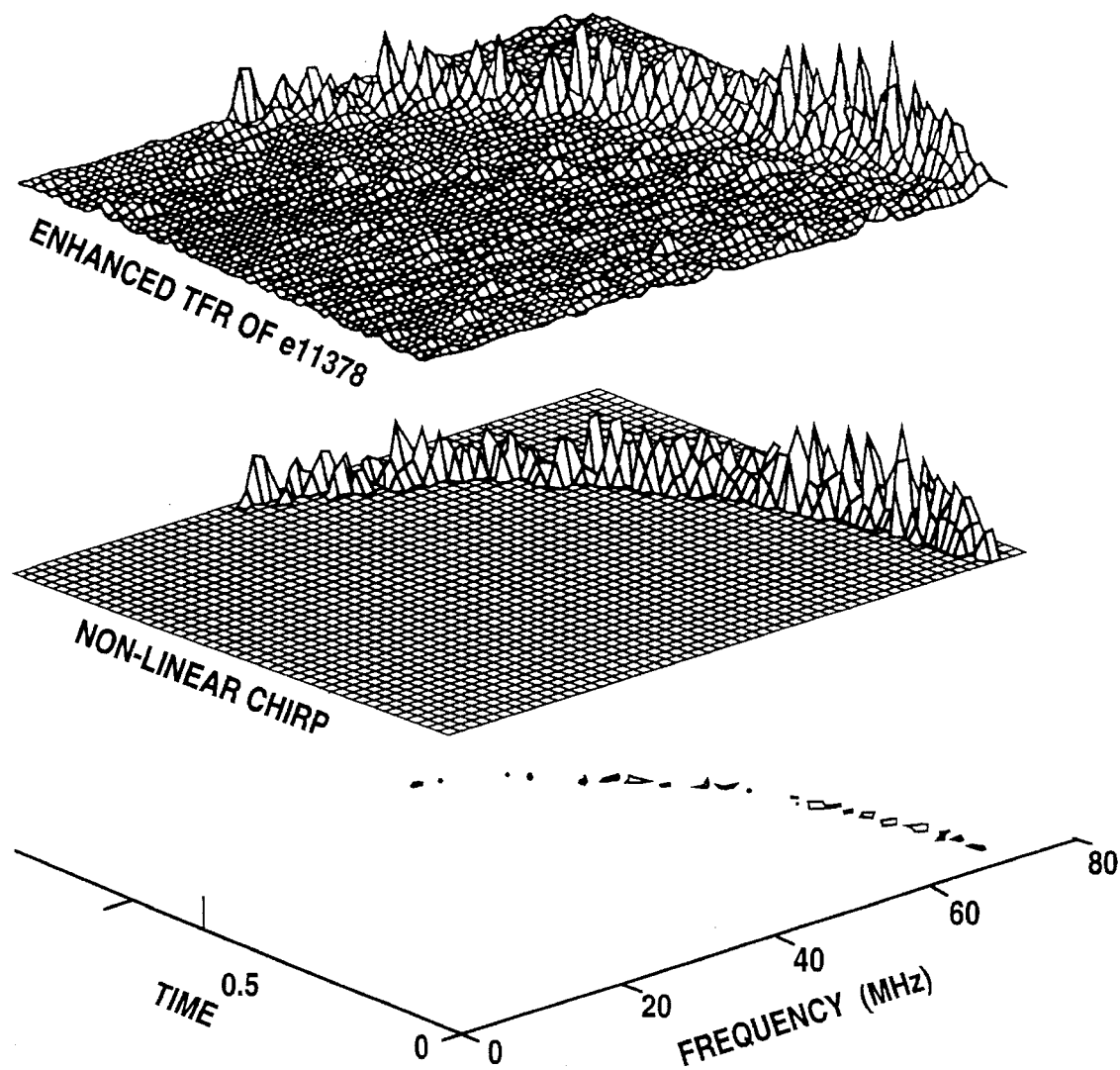
FIG. 3 depicts a procedure for computing instantaneous frequency based on a signal joint time-frequency representation.

In step 126, the portions of the joint time-frequency plot of interest are marked and projected on the time-frequency plane, thereby reducing the modified P(t,f) to a multivalued function f(t). This involves estimating the instantaneous frequency and is illustrated in FIG. 3. This reduces the modified $TFDS_2$ (t,f)("noiseless" $TFDS_2(t,f)$) to a multivalued function f(t). As shown in the bottom plot of FIG. 3, the multivalued function f(t) will generally have more than one frequency component at a particular time, and vice versa. In other words, step 126 involves mapping the three dimensional joint time-frequency distribution series to a 2-dimensional graph of a multi-valued function, as shown in FIG. 3. For example, if the received signal x(t) is a non-linear chirp function, then the portions of the time-frequency plot which correspond to the non-linear chirp functions are marked and projected on the time-frequency plane. As mentioned above, on the 2-dimensional graph, the multivalued function f(t) generally has a plurality of frequency points for each point in time, and vice versa.

In the preferred embodiment, a simple thresholding process is used which discards values below a certain limit. Other methods may be used to map the 3-D TFDS to a 2-dimensional plot, as desired. For example, a more complex weighted thresholding process may be used, as desired. In some implementations the desired precision of instantaneous frequency determination exceeds that available from level thresholding. In these instances a procedure using the frequency mean values at each time sample, but with all energy values below a minimum level set to zero, is preferred. Another possible procedure where there are many values of frequency with significant signal energy is to find the point of maximum energy change with respect to frequency on either side of the frequency value having maximum energy, and then to assign the mean of these two values as the instantaneous frequency value at this location. Other techniques may use the energy of each sample above a threshold value to set the appropriate weight in a non-linear curve fitting algorithm, such as Simplex, Levenberg-Marquardt, or Conjugate Gradient.

Figure 4:
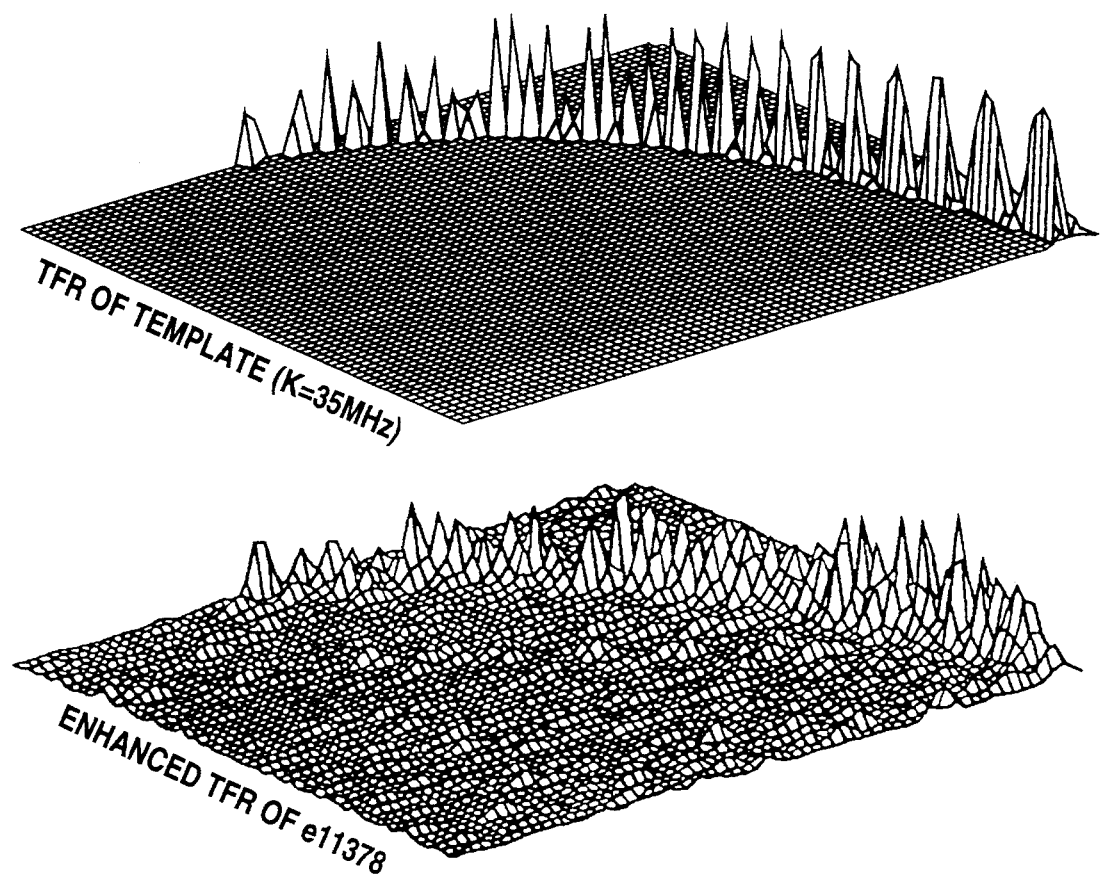
FIG. 4 illustrates a received signal x(t) containing the signal of interest and the matching time template.

In step 128 a curve fitting technique is applied to derive a general instantaneous frequency function $\phi'(t)$, i.e., to derive a parametric model $\phi'(t)$ to fit all possible $f(t)$. In the preferred embodiment, the Levenberg-Marquardt method is used to curve fit the trajectory of the $TFDS_2(t,f)$, using the LabVIEW graphical programming environment from National Instruments Corporation. FIG. 4 illustrates a received signal x(t), referred to as e1378 (bottom) and the corresponding trajectory. The curve fitting performed in step 128 is used to find the equation that best matches the trajectory of the TFDS that was projected on the 2-dimensional graph. In other words, the curve-fitting steps reduce the multi-valued function f(t) to a single-valued function f(t). In step 130 the function obtained in step 128 is integrated along t to produce $\phi(t)$. In step 132 this function is substituted into the equation for the general time domain template.

In step 134 a suitable amplitude A(t) is determined for the time template equation. The amplitude A(t) is preferably selected whereby A(t) has properties common to all signals of interest. It is noted that assumption of unit amplitude gives minimum instantaneous bandwidth, and is best applied when no a priori knowledge of spectral content for the original x(t) is available. For the most general signal detector, the time template is preferably as robust as possible, which requires that the amplitude A(t) have properties common to all signals of interest. In other words, an instantaneous bandwidth function is selected that best matches the entire ensemble of signal bandwidths, and does not introduce unwanted constraints in the coherence of A(t) during the chirp. The amplitude A(t) preferably allows adequate recognition of the SNR for all signals tested. In the preferred embodiment, a unit amplitude is selected. However, more complex forms of the amplitude A(t) may be used as desired, depending on the application.

Figure 5:
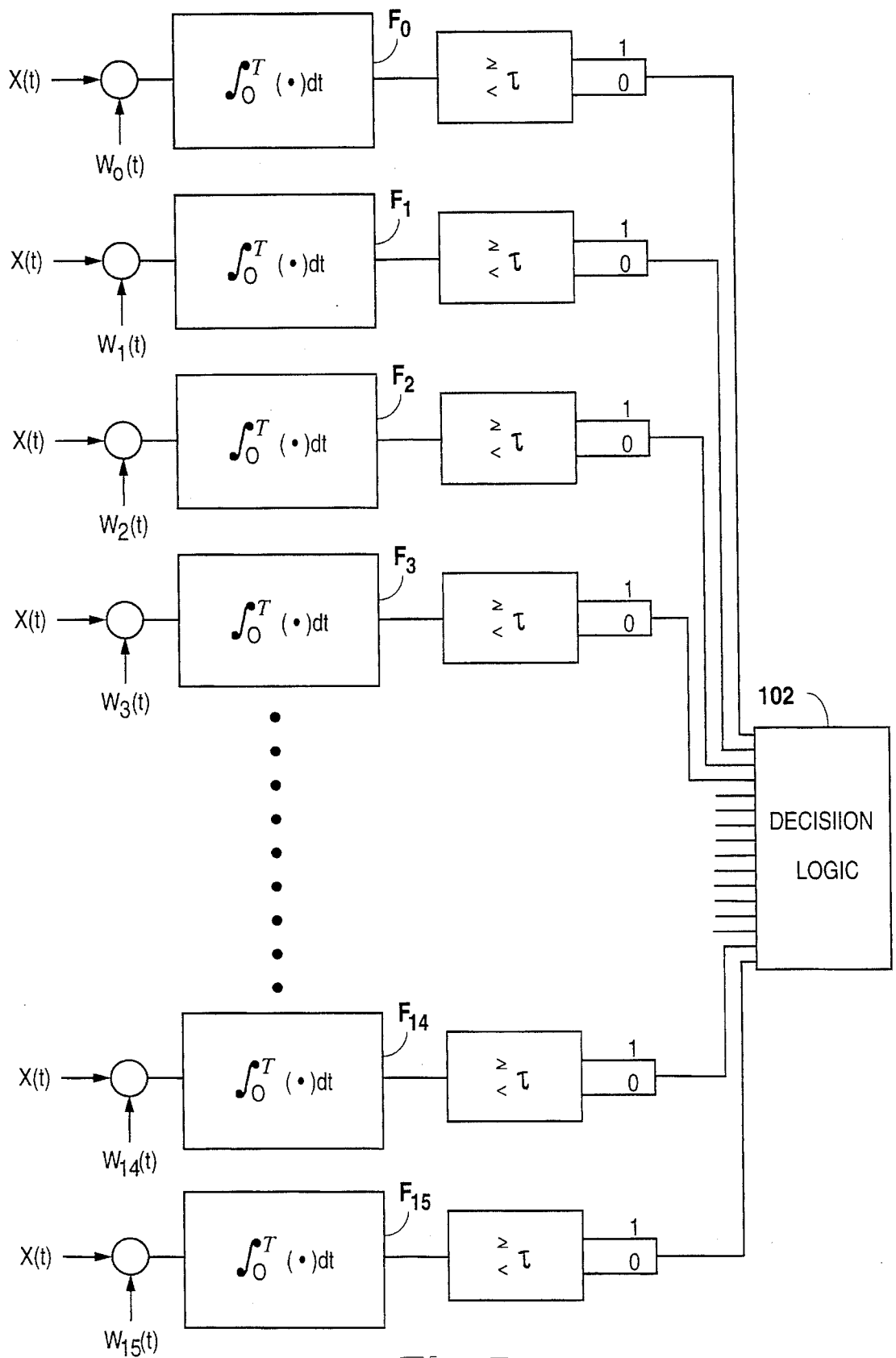
FIG. 5 illustrates a matched filter bank for detecting received dispersed broadband signals according to one embodiment of the present invention.

Once the time template has been determined in steps 122–134, in step 136 one or more transversal filters or matched filters are constructed using one or more forms of the time template. An example of a filter bank constructed according to step 136 is shown in FIG. 5, and this Figure is discussed in greater detail below. The filters constructed in step 136 accurately detect the presence of the signals of interest. The number of time templates used matches the number of filters. Also, the number of different time templates used can be varied depending upon the amount of granularity desired. Thus, a greater number of varying time templates and corresponding filters can be constructed in step 136 to provide improved detection of signals of interest. Analog filters are preferably used because of the large amount of processing that would be required for digital filters. However, it is noted that in applications where the amount of processing can be accommodated by digital filters, digital matched filters may be used in step 136 as desired. Also, matched filters are preferably used, although it is noted that other types of filters, such as various forms of transversal filters, may be used. In one embodiment, 16 analog matched filters with time templates $w_k(t)$ varying uniformly across a range generally provide sufficient detection for many applications. It is also noted that a greater or lesser number of matched filters may be used as desired. The filters preferably use pipelining for increased efficiency. Thus, the matched filter bank constructed according to the present invention uses both pipelining and parallelism for increased speed. Since the construction of analog and digital matched filters, once a suitable time template has been found, is well known in the art, details of the construction of the one or more filters in step 136 are omitted for simplicity. For information on the construction of matched filters, please see Bernard Sklar, *Digital Communications,* Prentice Hall, 1988, which is hereby incorporated by reference. Please also see Parks and Burrus, *Digital Filter Design,* John Wiley & Sons, 1987 which is also incorporated by reference.

Where simulations indicate that all x(t) encountered in real applications are perfectly matched by a small group of time templates, the present invention preferably comprises building parallel matched filter banks for detection, wherein each filter uses a different form of a time template that varies across a range of time templates. In other words, each filter uses the time template equation derived in steps 122–134 with different parameter settings. The range of time templates used with different parameter settings preferably detects all possible signals of interest in real time applications. Alternatively, if one time template preferably matches all x(t) encountered in real applications, then only one filter is constructed using this one time template. In the more typical case, a plurality of time templates are necessary which vary according to one or more factors or variables. For example, if 16 different parameter settings of the time template are deemed necessary to match all occurrences of the signal x(t), then 16 filters are constructed, each using a different form of the time template. In determining the number of filters to be constructed in step 136, trade-offs can be made between filter cost and acceptable detection, as desired.

The system and method of the present invention can be used to develop filters for detecting any signals whose frequency content varies with time, including such diverse applications as geophysical research, acoustical signal analysis, satellite communications, and the natural sciences among others. As noted above, the actual signal s(t) is not required to have a frequency content which varies with time. If a signal s(t) travels through a media, wherein the media transforms or disperses the signal s(t) into a signal x(t) whose frequency content varies with time, then the present invention may be used to detect this signal. The template design methodology of the present invention can be used whenever the dispersed signal behavior follows a derivable or testable parametric rule.

EXAMPLE

In order to illustrate operation of the present invention, the filter design methodology of the present invention is used below to develop a matched filter bank for detecting the presence of broadband signals received by a satellite. For more information on this example, please see related co-pending application Ser. No. 322,054, titled "System and Method for Detection of Dispersed Broadband Signals," filed Oct. 12, 1994, whose inventors are Shie Qian and Mark Dunham, which is hereby incorporated by reference.

The real time detection of dispersed broadband signals is greatly desired in the field of satellite communications. In many applications a satellite orbiting the Earth is monitoring radio transmissions from the Earth for a broadband signal s(t) of interest. Signals traveling from the Earth to a satellite are required to pass through the ionosphere in order to reach the satellite. The ionosphere is the portion of the upper atmosphere which is sufficiently ionized by solar ultraviolet radiation so that the concentration of free electrons in the ionosphere affects the propagation of radio waves. A challenging problem in satellite communications is the detection of signals of interest that travel through the ionosphere.

A signal of interest s(t) that travels through an ionized gas (plasma) or the ionosphere becomes heavily dispersed resulting in a new signal referred to as x(t). There are several problems with detecting the transionospheric signal x(t) of interest. First, it is difficult to accurately detect the signal x(t) because in most applications the signal to noise ratio of x(t) is less than 0 db. In addition, since the bandwidth of the signal x(t) is typically around 75 MHz, a very large amount of sampling is required. Hence, it is impractical to store all of the data in the satellite or to send all of this data back to the Earth station. Thus, the heavily dispersed signal x(t) generally possesses a very low signal to noise ratio, i.e., the received signal x(t) is very corrupted. Therefore, the detection of these signals has proved very difficult.

Many satellite monitoring applications comprise the monitoring of natural phenomena, such as lightning, tornadoes and earthquakes, etc. For example, the analysis of impulsive signal events caused by lightning are an important aspect of research in climate change and global electrodynamics. In the monitoring of natural phenomena, the received signal x(t) of interest only appears a few times a day and then only lasts a few milliseconds when it does appear. In other words, the majority of the data collected by the satellite is useless information. The bandwidth of these broadband signals is generally approximately 75 MHz, and thus the corresponding sampling rate which would be required to be used is 150 MHz, corresponding to 150 million samples per second. A tremendous amount of memory would be required in a satellite to store each of these samples, and in addition a tremendous amount of communications bandwidth would be required to provide this data back to the respective Earth station for processing. Therefore, a principle issue in effective transionospheric signal detection and analysis has been to detect the presence of signals of interest x(t) in real time and thus reduce the amount of data needed for transmission to Earth.

Referring now to FIG. 5, a matched filter bank for detecting signals which was designed and constructed using the method of the present invention is shown. In this embodiment, 16 analog matched filters $F_0$–$F_{15}$ are constructed. Each of the analog matched filters $F_0$–$F_{15}$ receives the dispersed broadband signal x(t), which comprises the signal s(t) of interest which has become heavily dispersed by transmission through an ionized gas or the ionosphere. Each of the analog matched filters $F_0$–$F_{15}$ compares the dispersed broadband signal x(t) with a robust time template $w_k(t)$ that has been designed according to the present invention to approximate the signals of interest. As shown, this comparison preferably uses correlation techniques whereby the received signal x(t) and the time template $w_k(t)$ are correlated, and the result is compared against a threshold value $\tau$. Each of the analog matched filters $F_0$–$F_{15}$ generates a signal indicative of the presence of the dispersed broadband signal. If the result of the correlation is greater than the threshold value $\tau$, then the output of the respective filter is a 1 value, and the signal of interest x(t) is determined to be present. Each of the indicating signals generated by the filters $F_0$–$F_{15}$ are provided to decision logic 102 which produces an output signal that indicates whether the dispersed broadband signal has been received. The decision logic 102 indicates that the dispersed broadband signal has been received if one or more of the matched filters $F_0$–$F_{15}$ detect the presence of the dispersed broadband signal.

The number of time templates used matches the number of analog matched filters $F_0$–$F_{15}$. Also, the number of different time templates used can be varied depending upon the amount of granularity desired. Thus, a greater number of varying time templates and corresponding matched filters can be used to provide improved detection of signals of interest. In this example, 16 analog matched filters with time templates $w_k(t)$ varying uniformly across a range were found to provide sufficient detection. The equation for the time template $w_k(t)$ in this example is preferably:

$$w_k(t) = \cos\{2\pi(f_\infty t - 2\sqrt{Kt})\}\left\{U\left(t - \frac{K}{(f_\infty - f_0)^2}\right) - U\left(t - \frac{K}{(f_\infty - f_s/2)^2}\right)\right\}$$

where $f_s$ denotes the sampling frequency, which is twice the highest frequency contained in x(t); K is the curvature constant for the chirp; $f_0$ is the start frequency; and the instantaneous frequency asymptotically converges to $f_\infty$, which is close to the mixer frequency, and is set by the minimum transmitted frequency in this ionospheric path.

In the present example, the K value of the time template for each of the filters preferably varies. In this embodiment, K preferably varies from 10 to 75 MHz in 5 MHz increments. The $\tau$ value used in each of the matched filters to determine if the broadband signal has been received is based on the hardware implementation and the amount of background noise, i.e., the hardware device noise and the background noise. In the example of FIG. 5, $\tau$ is several times larger than the standard deviation of the background noise, where the value is determined based on a trade-off between the probabilities of false alarms and missed detections. In one embodiment, $\tau$ is set to five times the standard deviation of the background noise.

The time template $w_k(t)$ is derived as follows. The signal of interest is referred to as s(t), the impulse response of the plasma or ionized gas is h(t), and the received signal x(t) can be modeled as s(t) * h(t), i.e., the signal s(t) convolved with the impulse response of the ionized gas h(t). Since s(t) is broadband (all pass), the frequency response of the received signal is $$X(f) = S(f)H(f) \approx CH(f),$$

where C denotes a real-valued constant. The above equation shows that due to the assumed impulsive nature of s(t), x(t) tends to the transfer function h(t). First, it is noted that the impulse response h(t) of the plasma or ionized gas can be modeled as a non-linear chirp function. A chirp function is a signal function whose frequencies monotonically increase or decrease with time. The signal x(t) can be modeled as a chirp-type function, even though the signal s(t) necessarily varies from case to case. Accordingly, the signal x(t) is better recognized using the joint time-frequency domain than either the time domain or the frequency domain alone. However, for most applications, detection of the signal of interest in the joint time-frequency domain in real time is impractical due to the tremendous amount of signal processing required.

As discussed above, the system of the present invention comprises a method for developing a robust time template in the time domain, which is used to construct a filter bank for the real time detection of the signals of interest. Although the received dispersed broadband signal x(t) is in general a chirp-type function, the rate of change of frequency content and bandwidth generally varies dramatically, and thus it would normally be difficult to develop a robust template to match x(t) in either the time or frequency domain alone. However, the present invention has solved this problem and can be used to develop a robust time domain template to accurately detect signals of interest in real time.

Referring again to FIG. 2, in step 122 data is collected regarding the received signal of interest. In this example, the data was generated from the DOE radio science experiment, Blackbeard, (the satellite) and obtained from Los Alamos National Laboratory. In step 124 a joint time-frequency representation is generated to describe these signals using the TFDS. In step 126, the portions of the joint time-frequency plot of interest are marked and projected on the time-frequency plane, thereby producing a multi-valued function $f(t)$ as shown in FIG. 3. The multi-valued function $f(t)$ is an estimation of the instantaneous frequency. In step 128 curve fitting techniques are applied to derive a general instantaneous frequency function $\phi'(t)$.

At this point it is noted that the Blackbeard satellite data is inverted in frequency content, as a result of being a lower sideband mixing product with a local oscillator. While this inversion is easily reversed by numerically multiplying the data with another carrier function, and low pass filtering, there is no reason to do so. The method of the present invention can just as easily be used to match the inverted behavior as the non-inverted, since a physical model is not explicitly used. Therefore, in this example, a time template is developed based entirely on the inverted chirp functions transcribed by the Blackbeard satellite.

By testing several forms, including a cubic and exponential curve, the best formula to describe the band limited chirp trajectory is found as $$t = t_0 + \frac{K}{[f_\infty - \phi'(t)]^2}, \quad f_0 \leq \phi'(t) < f_\infty$$

where $t_0$ is the arrival time of the non-linear chirp signal, and K is the curvature constant for the chirp. $\phi'(t)$ asymptotically converges to $f\infty$, which is close to the mixer frequency, and is set by the minimum transmitted frequency in this ionospheric path. The above equation was discovered using the method of the present invention and, with different parameter settings, fits all non-linear chirp patterns encountered in real applications.

Without loss of generality, let $t_0=0$. Then the instantaneous frequency is $$\phi'(t) = f_\infty - \sqrt{\frac{K}{t}}$$

where $f_0 \leq \phi'(t) < f_\infty$. Integrating $\phi'(t)$ along t in step 130 yields $$\phi(t) = f_\infty t - 2\sqrt{Kt}.$$

Finally, substituting this equation into the form of the time domain template in step 132 gives:

$$w_k(t) = \cos\{2\pi(f_\infty t - 2\sqrt{Kt})\}A(t),$$

where $f_s$ denotes the sampling frequency, which is twice the highest frequency contained in x(t) and $f_0$ is the start frequency.

The amplitude function is determined in step 134 using the unit step function U(t) as follows:

$$A(t) = U\left[t - \frac{K}{(f_\infty - f_0)^2}\right] - U\left[t - \frac{K}{(f_\infty - f_s/2)^2}\right],$$

This ensures that the time template $w_k(t)$ sweeps from $f_0$ to $f_s/2$. Assumption of unit amplitude gives minimum instantaneous bandwidth, and is best applied when no a priori knowledge of spectral content for the original x(t) is available.

As discussed above, for the most general signal detector, the time template is preferably as robust as possible, which requires that the amplitude A(t) have properties common to all signals of interest. In other words, an instantaneous bandwidth function is selected that best matches the entire ensemble of signal bandwidths, and does not introduce unwanted constraints in the coherence of A(t) during the chirp. At present the amplitude A(t) used above allows adequate recognition of the SNR for all signals tested. However, more complex forms of the amplitude A(t) may be used as desired.

In step 136, a band of matched filters are constructed using various forms of the determined time template, as shown in FIG. 5. In this embodiment, 16 analog matched filters are used as described above, each using a form of the time template with different parameter settings.

Simulations

Since one object of the present invention is a system and method for developing filters to detect signals of interest, the matched filter bank developed above in the example according to the method of the present invention [for transionospheric chirp detection] was tested against an ensemble of actual data recorded by the DOE radio science experiment, Blackbeard, launched by a Pegasus vehicle into an 850 km orbit on October 1993. The details of this experimental wideband radio receiver have been reported elsewhere, and it is interesting to note the parameters relevant from a signal processing point of view. In all cases the sample rate is 150 Megasamples/second, the mixer frequency which inverts the spectrum is 100 MHz, so that signal frequencies at 100 MHz are translated to DC, while signals at the 25 MHz lower bandwidth limit are translated to 75 MHz apparent frequency in the data records. The fundamental quantization is 8 bits, giving an effective dynamic range for most frequencies of about 40 dB. $f_0$ is set to 0 and $f\infty$ is set to 94 MHz (mixer frequency—6 MHz minimum ionospheric frequency). It is noted that Blackbeard has only a simple level threshold trigger, and cannot resolve less than 4 Megabyte record lengths. Therefore a major success of the operation of the present invention is the demonstration in post-processing software of the ability to sort chirps out of the enormous records of blank signals recorded by the satellite.

To perform the tests, the cross correlation of x(t) and $w_k(t)$ is taken, preferably using sixteen different K(10, 15, 20, . . ., 75 MHz), and the correlation window is moved in block steps through the 1 to 4 Megasample data lengths. In hardware each K value is preferably represented by a separate, parallel cross correlation processor or filter, and the signal streams through each continuous analog correlation processor. A total of ten Blackbeard files were tested, with 100% recognition demonstrated, based on a simple level threshold trigger applied to the smoothed and rectified cross-correlation output. Two examples of the data are graphically shown in FIGS. 6 and 7, with the output of the successful cross correlation filter. These files are a variety of natural lightning signals and pulse stimulation by a VHF impulse generator situated at Los Alamos.

Figure 6:
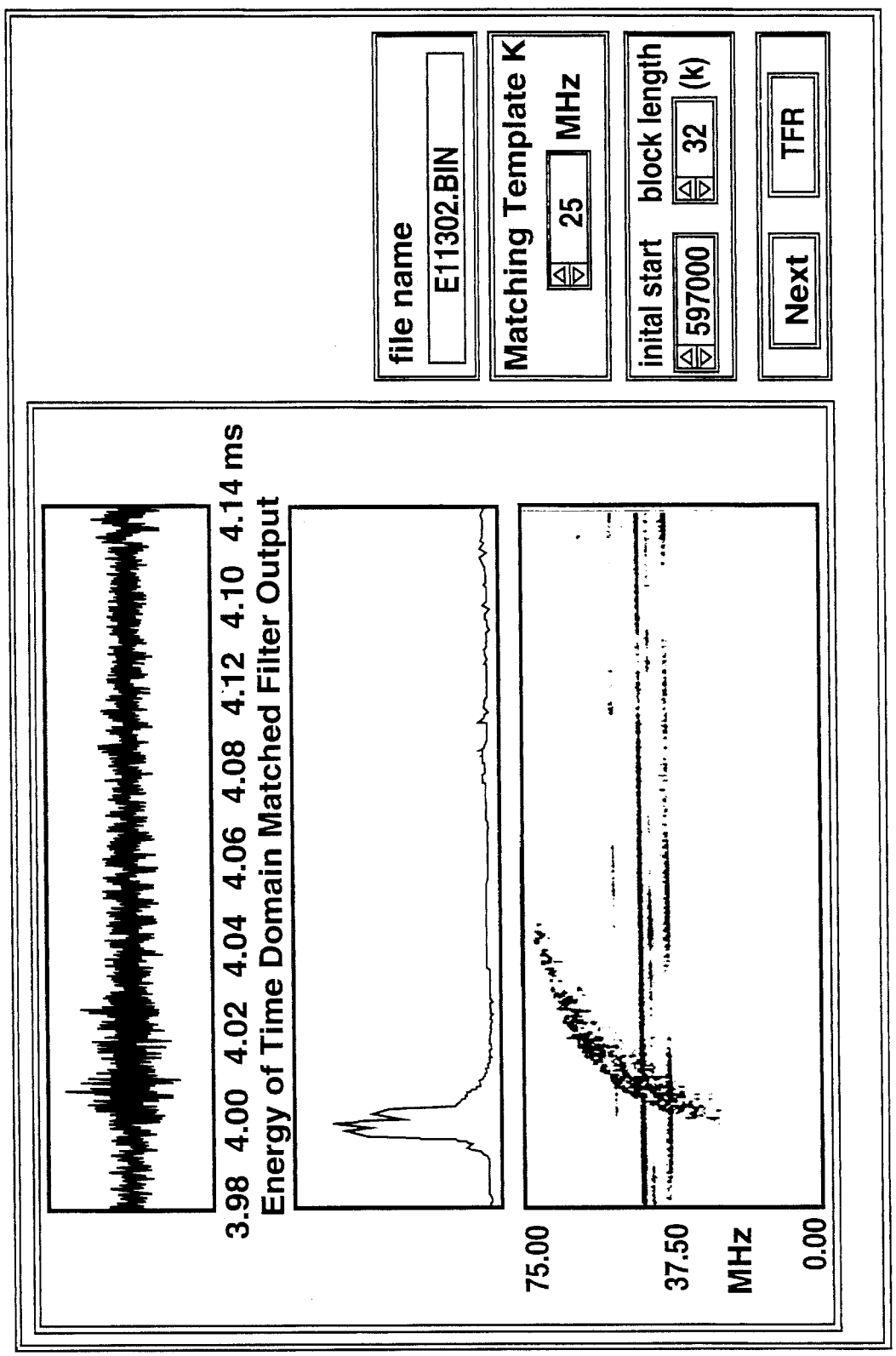
FIGS. 6–7 illustrate processing of a chirp signal from an ensemble of signals to detect signals of interest using the matched filter bank of FIG. 5 developed according to the present invention.

FIG. 6 illustrates the result of processing Chirp #e11302 from the ensemble. This is a naturally occurring signal assumed to be due to atmospheric discharge or lightning. The top plot is the time waveform, which resembles incoherent noise and where the region of interest normally lasts less than one millisecond. The middle plot is squared matched filter outputs. The bottom portion is the corresponding intensity plot of $TFDS_2(t,f)$. This record serves as an example of performance in a stronger signal domain, and shows the larger cross-correlation output obtained for the signal. In either case, there is no difficulty in detecting the recognition pulse output with very standard techniques.

Figure 7:
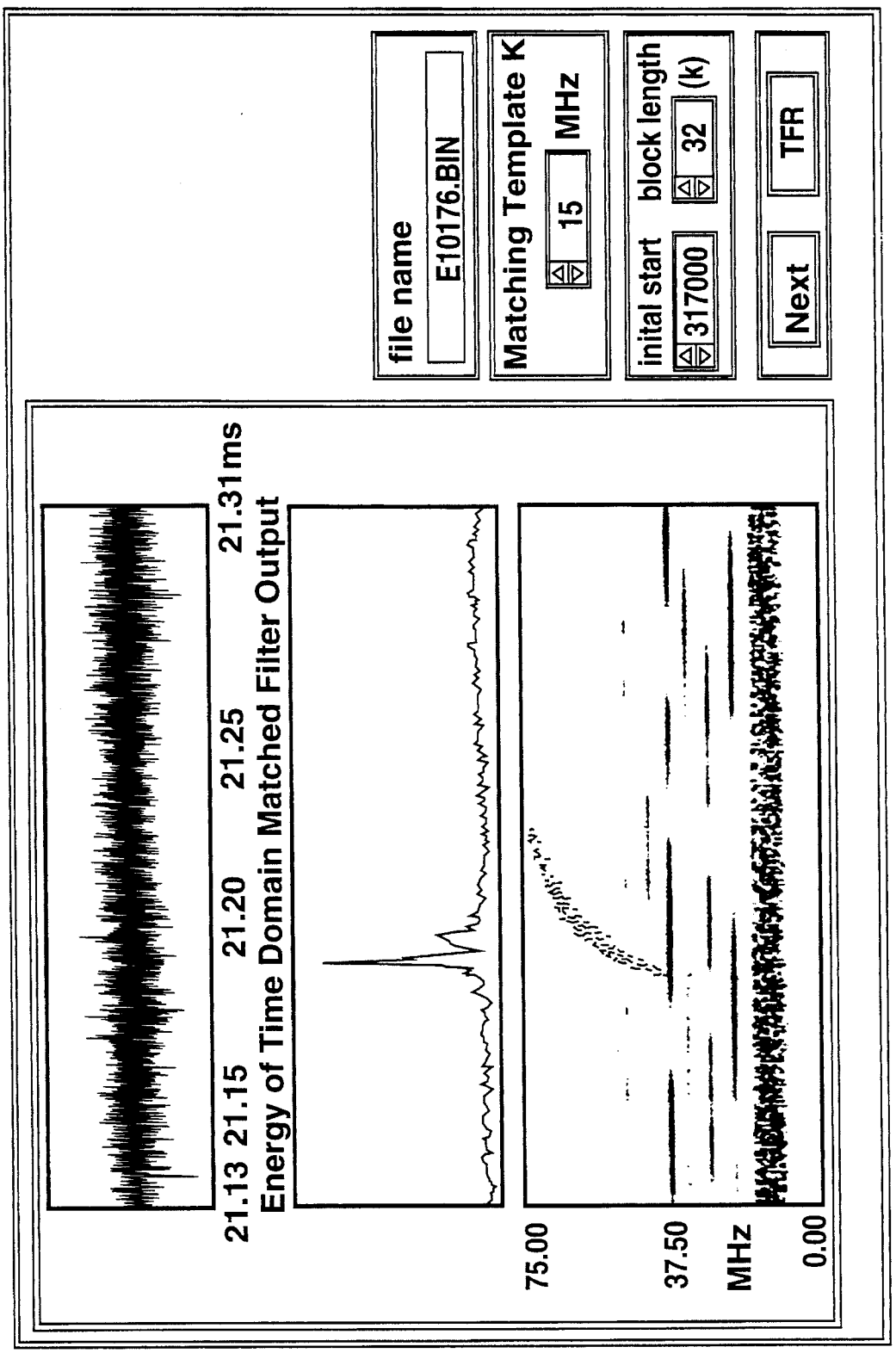

FIG. 7 is an example of chirp filter performance on a much weaker artificial signal from a Los Alamos pulser, satellite record #e10176. The chirp is barely distinguishable in the joint time-frequency domain, and has peak power less than 1/20 of peak interference. However, the output of the matched filter is still robust, with a peak/RMS SNR of at least 10. Using classical pulse detection theory, such an SNR implies a combined probability of error in detection of $10^{-7}$. This is more than adequate for most scientific work, indicating a successful detector has been synthesized.

By working with all of the data ensemble, and using a sparse set of K values, cross correlation outputs for all chirps were found to be as robust as FIGS. 6 and 7. This shows that all transionospheric signals collected can be detected by at least one $w_k(t)$, and implies that for typical ionospheric conditions, all chirp signals can detected by fewer than sixteen parallel matched filters. If the ionospheric density changes drastically, as from the peak to minimum of the sun spot cycle, a new set of chirps may need to be periodically changed in, but the largest simultaneous number needed in this example appears to be 16.

$w_k(t)$ Variations

As previously noted, the satellite data obtained from the Blackbeard satellite in step 122 is inverted in frequency content. The received signal x(t) is provided to the satellite and is transformed using a lower side mixer with a local oscillator. The remaining steps 124–136 are performed using this data, whose frequency content has been inverted. However, it is noted that the method described in FIG. 2 can also be used for the original, non-inverted data. If the method of FIG. 2 is used on non-inverted received signal data, the instantaneous frequency function is similar to the formula proposed by Massey below, except $f_B=0$.

$$T(f) = t_0 + \frac{1.343 \times 10^{-7} N_e}{f^2} \left( 1 \pm \frac{f_B}{f} \right)$$

where $t_0$ is the hypothetical arrival time of the undispersed signal s(t), $N_e$ is the integral electron density along the propagation path, and $f_B$ is the electron cyclotron frequency calculated using component of B parallel to the path of propagation. For more information on this equation, please see Massey "Ionospheric Group Delay and Phase Including Refractive Effects," Los Alamos Report, LA-11878-MS. This instantaneous frequency function can be integrated and substituted into the equation $$\int f(T) dT$$

to obtain a different time template that can be used to match received signals x(t) of interest which have not been inverted in frequency content. In a similar fashion, the present invention can be used to construct one or more filters to detect any signal of interest whose frequency content changes with time.

Conclusion

Therefore, the present invention comprises a system and method for constructing one or more robust filters, employing a synthesized time template derived by joint time-frequency analysis, for detection of signals whose frequency content varies with time. A critical requirement is that the frequency trajectory have a deterministic form suitable for description by a smooth functional form. Since this is manifestly the case for many signals, the resulting detector is optimum for maximizing SNR of the received signal in both random and coherent backgrounds. By demonstrating that a sparse set of K values adequately spans the observed space for chirp-type signals, the system of the present invention is suitable for analog implementation. The present invention is able to detect signals in real time, using analog convolutional structures. Finally, the filter and time template design methodology of the present invention is very general, and can be applied to many signal detection problems found in biological, medical acoustics, ultrasonic testing, satellite communications and geophysical applications, among others.

Therefore, the present invention uses time-frequency representation techniques to derive a robust time template for detection of signals. This robust time template is used in one or more filters. The resulting detector is not only optimum in the sense of maximizing SNR, but also is suitable for analog implementation. Therefore, it is possible to detect the signals in real time. Moreover, the time template design methodology presented herein is rather general, which can be applied to many time-varying signal detection problems.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for constructing one or more filters to detect signals having a frequency content which varies with time, comprising the steps of:

collecting data regarding the signals:

computing a joint time-frequency representation of the signals;

mapping the joint time-frequency representation to a multi-valued function;

curve-fitting the multi-valued function to derive an instantaneous frequency function $\phi'(t)$;

integrating the instantaneous frequency function $\phi'(t)$ to obtain $\phi(t)$;

determining a time template equation using said function $\phi(t)$;

constructing one or more filters which receive the signals and compare the signals with one or more terms of said time template equation, wherein said one or more filters detect the signals.

2. The method of claim 1, wherein said step of computing a joint time-frequency representation of the signals comprises computing a joint time-frequency distribution series of the signals.

3. The method of claim 1, wherein said step of computing a joint time-frequency representation of the signals comprises computing a Short Time Fourier Transform (STFT) of the signals.

4. The method of claim 1, wherein said step of computing a joint time-frequency representation of the signals comprises computing a 3-dimensional representation of the signals of time vs. frequency vs. signal energy.

5. The method of claim 4, wherein said step of mapping the joint time-frequency representation to a multi-valued function comprises mapping the joint time-frequency to a 2-dimensional multi-valued function of time vs. frequency.

6. The method of claim 1, wherein said step of mapping comprises applying a thresholding process to said joint time-frequency representation of the signals to map said joint time-frequency representation of the signals to the multi-valued function.

7. The method of claim 1, wherein said step of mapping comprises determining the relative energy of each sample of said joint time-frequency representation above a threshold value;

wherein said step of curve-fitting uses said relative energy of each sample to set the appropriate weights in a non-linear curve fitting algorithm; and wherein said step of curve-fitting uses said non-linear curve fitting algorithm.

8. The method of claim 1, wherein said step of curve-fitting uses Levenberg-Marquardt curve-fitting techniques.

9. The method of claim 1, wherein said step of curve-fitting uses one or more techniques from the group consisting of Simplex, Levenberg-Marquardt, and Conjugate Gradient.

10. The method of claim 1, wherein said time template equation is:

$$A(t) \cos \{2\pi\phi(t)\}.$$

11. The method of claim 1, further comprising the steps of:

determining an amplitude A(t); and incorporating said amplitude A(t) into said time template equation.

12. The method of claim 11, wherein said amplitude A(t) comprises a unit step function.

13. The method of claim 1, wherein said step of constructing one or more filters comprises constructing a bank comprising a plurality N of filters, wherein each of said plurality N of filters compares the signals with a respective form of said time template equation to detect the signals.

14. The method of claim 13, wherein said step of constructing one or more filters comprises constructing a bank comprising a plurality N of filters, wherein each of said plurality N of filters compares the signals with a unique form of said time template equation that varies according to one or more parameters;

wherein said plurality N of filters each compare the signals with one of a corresponding plurality N of different forms of said time template equation.

15. The method of claim 14, wherein said plurality N of different forms of said time template equation are designed to match various possible forms of the signals.

16. The method of claim 1, wherein said step of constructing one or more filters comprises constructing a bank of transversal filters.

17. The method of claim 1, wherein said step of constructing one or more filters comprises constructing a bank of matched filters.

18. A method for constructing one or more filters to detect signals having a frequency content which varies with time, comprising the steps of:

collecting data regarding the signals;

computing a joint time-frequency representation of the signals;

calculating an instantaneous frequency function $\phi'(t)$ using said joint time-frequency representation of the signals;

integrating the instantaneous frequency function $\phi'(t)$ to obtain $\phi(t)$;

determining a time template equation using said function $\phi(t)$;

constructing one or more filters which receive the signals and compare the signals with one or more forms of said time template equation, wherein said one or more filters detect the signals.

19. The method of claim 18, wherein said step of computing a joint time-frequency representation of the signals comprises computing a joint time-frequency distribution series of the signals.

20. The method of claim 18, wherein said step of computing a joint time-frequency representation of the signals comprises computing a Short Time Fourier Transform (STFT) of the signals.

21. The method of claim 18, wherein said step of computing a joint time-frequency representation of the signals comprises computing a 3-dimensional representation of the signals of time vs. frequency vs. signal energy.

22. The method of claim 18, wherein said step of calculating comprises determining the frequency mean values at each time sample of said joint time-frequency representation with all energy values below a certain minimal value set to zero to calculate said instantaneous frequency function $\phi'(t)$.

23. The method of claim 18, wherein said joint time-frequency representation includes many frequency values at each time sample with significant signal energy; and wherein said step of calculating comprises finding the point of maximum energy change with respect to frequency on either side of the frequency value at each time sample having maximum energy, and then assigning the mean of these two values as the instantaneous frequency value at this location.

24. The method of claim 18, wherein said step of calculating an instantaneous frequency function comprises:

mapping the joint time-frequency representation to a multi-valued function; and curve-fitting the multi-valued function to derive an instantaneous frequency function $\phi'(t)$.

25. The method of claim 24, wherein said step of mapping the joint time-frequency representation to a multi-valued function comprises mapping the joint time-frequency to a 2-dimensional multi-valued function of time vs. frequency.

26. The method of claim 24, wherein said step of mapping comprises applying a thresholding process to said joint time-frequency representation of the signals to map said joint time-frequency representation of the signals to the multi-valued function.

27. The method of claim 24, wherein said step of curve-fitting uses Levenberg-Marquardt curve-fitting techniques.

28. The method of claim 18, wherein said time template equation is:

$$A(t) \cos \{2\pi\phi(t)\}.$$

29. The method of claim 18, further comprising the steps of:

determining an amplitude A(t); and incorporating said amplitude A(t) into said time template equation.

30. The method of claim 29, wherein said amplitude A(t) comprises a unit step function.

31. The method of claim 18, wherein said step of constructing one or more filters comprises constructing a bank comprising a plurality N of filters, wherein each of said plurality N of filters compares the signals with a respective form of said time template equation to detect the signals.

32. The method of claim 31, wherein said step of constructing one or more filters comprises constructing a bank comprising a plurality N of filters, wherein each of said plurality N of filters compares the signals with a unique form of said time template equation that varies according to one or more parameters;

wherein said plurality N of filters, each compare the signals with one of a corresponding plurality N of different forms of said time template equation.

33. The method of claim 18, wherein said plurality N of different forms of said time template equation are designed to match various possible forms of the signals.

34. The method of claim 18, wherein said step of constructing one or more filters comprises constructing a bank of transversal filters.

35. The method of claim 18, wherein said step of constructing one or more filters comprises constructing a bank of matched filters.

* * * * *

UNITED STATES PATENT AND TRADEMARK OFFICE
CERTIFICATE OF CORRECTION

PATENT NO. : 5,574,639

DATED : November 12, 1996

INVENTOR(S) : Qian et al.

It is certified that error appears in the above-indentified patent and that said Letters Patent is hereby corrected as shown below:

Claim 1, col. 16, line 63, please delete "terms" and substitute therefor -- forms --.

Signed and Sealed this

First Day of April, 1997

Attest:

Attesting Officer

BRUCE LEHMAN
Commissioner of Patents and Trademarks